(12) United States Patent
Ganapathiappan

(10) Patent No.: US 7,553,886 B2
(45) Date of Patent: Jun. 30, 2009

(54) CROSS-LINKED LATEX PARTICULATES

(75) Inventor: Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3 days.

(21) Appl. No.: 11/789,350

(22) Filed: Apr. 23, 2007

(65) Prior Publication Data

US 2008/0257205 A1  Oct. 23, 2008

(51) Int. Cl.
*C09D 11/00* (2006.01)
*C08F 20/10* (2006.01)

(52) U.S. Cl. .................. 523/160; 523/161; 526/89; 526/328

(58) Field of Classification Search .................. None
See application file for complete search history.

(56) References Cited

U.S. PATENT DOCUMENTS

| | | | |
|---|---|---|---|
| 4,256,858 A | 3/1981 | Behr | |
| 4,609,713 A | 9/1986 | Burton | |
| 4,806,348 A * | 2/1989 | Hartl et al. | ............... 424/130.1 |
| 4,985,519 A | 1/1991 | Koishi et al. | |
| 5,880,234 A | 3/1999 | Maeda et al. | |
| 6,103,788 A | 8/2000 | Harui et al. | |
| 6,323,306 B1 * | 11/2001 | Song et al. | .................. 528/342 |
| 6,506,245 B1 | 1/2003 | Kinney et al. | |
| 6,713,584 B1 | 3/2004 | Chisholm et al. | |
| 7,067,614 B2 * | 6/2006 | Rea | .......................... 528/480 |
| 7,087,654 B2 * | 8/2006 | MacDonald et al. | ........... 521/27 |
| 7,220,528 B2 * | 5/2007 | Ganapathiappan | ..... 430/137.16 |
| 7,271,237 B2 * | 9/2007 | Rea | .......................... 528/480 |
| 7,273,842 B1 * | 9/2007 | VanDyk et al. | ............. 510/475 |
| 7,316,919 B2 * | 1/2008 | Childs et al. | ................. 435/177 |
| 2003/0055178 A1 * | 3/2003 | Gore et al. | .................... 525/242 |
| 2004/0087691 A1 * | 5/2004 | Ganapathiappan | .......... 524/160 |
| 2004/0194334 A1 * | 10/2004 | Rea | .............................. 34/179 |
| 2006/0068131 A1 | 3/2006 | Hanrahan | |

FOREIGN PATENT DOCUMENTS

| | | |
|---|---|---|
| JP | 54-090387 | 7/1979 |
| JP | 10-218797 | 8/1998 |
| WO | WO 99/46310 | 9/1999 |

\* cited by examiner

*Primary Examiner*—David Wu
*Assistant Examiner*—Vu Nguyen

(57) ABSTRACT

The present invention is drawn to cross-linked latex particulates. The latex particulates include a plurality of polymerized monomers and cross-linking agent. The cross-linking agents are of particular structures and include at least one Cl or Br. From about 0.05 wt % to about 15 wt % of the latex particulate is cross-linked with the cross-linking agent. Such latex particulates can be used in latex suspensions and inks.

19 Claims, No Drawings

CROSS-LINKED LATEX PARTICULATES

BACKGROUND OF THE INVENTION

Latex particles obtained by emulsion polymerization can have a variety of applications, including for use as model colloids for calibration of instruments used to measure particle size, for immobilization of biomolecules (such as proteins or peptides) on the surface of the particles, for development of new types of immunoassays, and for film formation for ink-jet printing, painting, and coating applications. While latex particulates have applications in these and other fields, the ink-jet ink imaging application can be used to favorably illustrate some of their unique attributes. Specifically, there has been great improvement in the area of water durability of ink-jet inks through incorporation of certain ink-jet compatible latex polymers. When printed as part of an ink-jet ink, a latex component of the ink can form a film on a media surface, entrapping and protecting the colorant within the hydrophobic print film.

This being said, while latex particulates can improve durability of prints, they undergo severe thermal shear conditions when printed through thermal ink-jet print heads. Moreover those polymers tend to settle out of inks over time and, therefore, often are not stable in many storage conditions. Thus, there is a continuing need to provide latex particulates having improved stability and durability for printing on a wide variety of media types and with a variety of printing architectures.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof. It should also be noted that while the discussion may focus on cross-linking agents, a latex particulate, a latex suspension, an ink-jet ink, or a method of preparing the latex particulates, such discussion in one area is applicable to the other areas.

It is noted that, as used in this specification and the appended claims, the singular forms "a," "an," and "the" include plural referents unless the context clearly dictates otherwise.

As used herein, the terms "vehicle" and "liquid vehicle" refer to the liquid fluid in which colorant or other material is carried to form an ink or fluid suspension. Liquid vehicles are well known in the art, and a wide variety of liquid vehicles may be used in accordance with embodiments of the present invention. Such ink vehicles may include a mixture of a variety of different agents, including without limitation, solvents, co-solvents, buffers, biocides, viscosity modifiers, sequestering agents, stabilizing agents, and water. The liquid vehicle can also carry other additives such as other polymers, UV curable materials, and/or plasticizers, in some embodiments. It is noted that if a colorant, e.g., dye and/or pigment, is present in liquid vehicle, the solution or dispersion (with or without the latex is considered to be an ink). In either of these embodiments, whether or not a latex is present in the ink, a latex dispersion can be used as an overcoat for the ink.

The term "colorant" can include dyes, pigments, and/or other particulates that may be suspended or solvated in a liquid vehicle in accordance with embodiments of the present invention. Dyes are typically water soluble and pigments are typically not water soluble. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a milled or unmodified pigment that utilizes a dispersant (which can be a polymer or an oligomer or a surfactant) in the liquid vehicle to aid the pigment in remaining dispersed therein.

As used herein, "latex particulates," and "latex particles" refer to polymeric masses synthesized from individual monomers, which can be dispersed in a liquid vehicle forming a latex dispersion, or latex. This term can also include latex encapsulated pigments where a pigment is at least partially encapsulated with a latex polymer.

As used herein, "plurality" refers to more than one. For example, a plurality of monomers refers to at least two monomers.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of components may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. This same principle applies to ranges reciting only one numerical value. Furthermore, such an interpretation should apply regardless of the breadth of the range or the characteristics being described.

With these definitions in mind, it has been recognized that it would be advantageous to develop latex particulates that exhibit improved stability, both in storage and under shear conditions that occur in ink-jet architecture, and further, can continue to exhibit appropriate film-forming properties when printed on a substrate. Cross-linking latex particulates can be used to improve stability and retain film-forming properties of the latex. However, many cross-linking agents are polyfunctional moieties that form chemical attachments with a latex particulate at random locations. Therefore, the latex particulates of the present invention include a plurality of polymerized monomers and a cross-linking agent that can more uniformly cross-link a latex particulate.

The cross-linking agent can have a variety of forms, but includes one or two Cl and/or Br atoms that function to cross-link the latex particulate. The cross-linking agents can cross-link the latex particulate to a degree of about 0.05 wt % to about 15 wt %. As the cross-linking increases, the rigidity of the particle increases. A particle with higher rigidity may have improved shear stability properties, however may also have decreased film-forming properties. Therefore, an amount of cross-linking from about 0.05 wt % to about 15 wt % with the disclosed cross-linking agents can balance the rigidity to allow for improved shear stability while not sacrificing film-forming capacity of the latex particulate.

In one aspect, the cross-linking agent comprises or consists essentially of the structure shown as Formula 1.

X—CH(R)—R'—CH(R)—X    Formula 1

In Formula 1, each X is independently Cl or Br; each R is independently C1 to C10 alkyl or aryl; and R' is independently C1 to C20 alkylene. For example, the compound of Formula 1 can be di-chlorinated, e.g. include two Cl; di-brominated, e.g. two Br; or can include a Cl and Br in the same compound.

In another aspect, the cross-linking agent can comprise or consist essentially of the structure shown as Formula 2.

X—CH$_2$—R'—CH$_2$—X    Formula 2

As with Formula 1, in Formula 2, each X is independently Cl or Br; and R' is C1 to C20 alkylene. For example, the compound of Formula 1 can be di-chlorinated, e.g. include two Cl; di-brominated, e.g. two Br; or can include a Cl and Br in the same compound. In a specific example, the cross-linking agent can be 1,3-dichloropropane.

Accordingly, a latex particulate can include a plurality of polymerized monomers and cross-linking agent which includes the structure of Formula 1, the structure of Formula 2, or combinations of both. The latex particulate can have from about 0.05 wt % to about 15 wt % of the latex particulate cross-linked with the cross-linking agent. In a further embodiment, from about 0.5 wt % to about 2 wt % of the latex particulate can be cross-linked with the cross-linking agent.

The cross-linking agents of Formulas 1 and 2 are non-polymerizable and are not polymerized into the latex particulate, but rather function as cross-linking linkers that link one portion of a polymer chain to another portion. In another embodiment, an alternative cross-linking agent can be used which is polymerizable. The cross-linking agent can have the structure of Formula 3.

CH$_2$=C(R')-A-B—CH$_2$—X    Formula 3

In Formula 3, X is Cl or Br; R' is H or CH$_3$; A is COO, CONH, CH$_2$, or arylene; and B is C1 to C20 alkylene or arylene. In a specific embodiment, X is Cl. In another embodiment, X is Br. In a further embodiment, R' is H. In yet another embodiment, R' is CH$_3$. In one aspect, A is COO. Alternatively, in another aspect, A is CONH. In still another aspect, A is CH$_2$, or an arylene in another aspect.

A latex particulate can include the cross-linking agent of Formula 3. Such latex particulate can include a plurality of polymerized monomers and a co-polymerized cross-linking agent of the structure of Formula 3. The cross-linking agent of Formula 3 acts as a cross-linking agent and as a monomer in the polymerization process. Once polymerized into the latex particulate, the cross-linking agent acts to cross-link the particulate by forming a bond with the Cl or Br and another part of the latex particulate. In one embodiment, from about 0.05% to about 15% of the latex particulate is cross-linked by the co-polymerized cross-linking agent. In a further embodiment, from about 0.5% to about 2% of the latex particulate is cross-linked with the cross-linking agent.

The monomers used to form a latex particulate can be any monomer presently known in the art, and are preferably primarily hydrophobic in nature. Such monomers can be used with the non-polymerizable structures of Formulas 1 and 2, or with the polymerizable structure of Formula 3. In one embodiment, the monomer can comprise or consist essentially of an acrylate, a methacrylate, or other vinyl containing monomers such as styrene. Non-limiting examples of monomers include methyl acrylate, ethyl methacrylate, ethyl acrylate, butyl methacrylate, butyl acrylate, hexyl methacrylate, 2-ethylhexyl methacrylate, 2-ethylhexyl acrylate, isobutyl methacrylate, isobutyl acrylate, octyl methacrylate, lauryl methacrylate, dodecyl methacrylate, styrene, and mixtures thereof. Additionally, the incorporation of up to 10% of acidic groups, e.g. such as with methacrylic acid, to the latex particulate can provide anionic stabilization to the latex particulates.

Depending on the anticipated application, it can be useful to have latex particulates of a particular size. The cross-linking agents of Formula 1 and Formula 2 are non-polymerizable and therefore are incorporated into the latex particulate only as a cross-linking agent where a carbon atom attached with the Cl and/or Br atoms form the cross-linking bonds. In some instances, the cross-linking agents can function additionally as chain transfer agents in reducing or limiting the overall latex molecular weight. In one embodiment, as applicable to any of the herein disclosed cross-linking agents, the latex particulate can have a particle size of about 100 nm to about 300 nm. Such size can be particularly useful in using the latex particulates in a thermal ink-jet ink.

The latex particulates of the present invention can be used in a variety of applications. In one aspect, the latex particulates can be dispersed in a liquid medium, thus forming a latex or latex dispersion. In a further embodiment, the latex can include 0.1 wt % to 50 wt % of the latex particulates dispersed in a liquid medium. Further, the latex can be an ink-jet ink. An ink-jet ink can include 0.1 wt % to 50 wt % of the latex particulates dispersed in a liquid vehicle and colorant. As previously mentioned, colorant can include dyes, pigments, and/or other particulates that may be suspended or solvated in a liquid vehicle in accordance with embodiments of the present invention. Dyes are typically water soluble and pigments are typically not water soluble. Pigments that can be used include self-dispersed pigments and polymer or surfactant dispersed pigments. The colorant can comprise or consist essentially of dye. Additionally, the colorant can comprise or consist essentially of pigment.

A method for forming a latex particulate according to the present invention can include dispersing a plurality of monomers in an aqueous emulsion and providing from about 0.01% to about 30% by weight of cross-linking agent. The cross linking agent can have the structure of Formula 1 or Formula 2, or mixtures thereof. The emulsion can be substantially free of other poly-functional cross-linking compounds. Polymerization of the monomers can be initiated, thus forming the latex particulates that are cross-linked by the cross-linking agent. In this manner, latex particulates are at least partially formed and then cross-linked by the cross-linking agent. The general polymerization of the monomers to latex particulates is done by emulsion polymerization. As such, polymerization parameters, such as selection of monomers, polymerization time, emulsion temperature and conditions, etc, can be selected based on desired latex particulates and/or anticipated uses.

In a specific embodiment, the cross-linking agent comprises or consists essentially of the form of Formula 1. In a further embodiment, the cross-linking agent having the structure of Formula 1 is substantially the same chemical. In an alternate embodiment, the cross-linking agent having the structure of Formula 1 includes a plurality of different chemical compounds.

Likewise, in another embodiment, the cross-linking agent can comprise or consist essentially of the cross-linking agent having the form of Formula 2. In an additional embodiment, the cross-linking agent having the structure of Formula 2 can be substantially the same chemical. In an alternative embodiment, the cross-linking agent having the structure of Formula 2 can include a plurality of different chemical compounds.

As discussed before, the compounds of Formula 1 and/or Formula 2 can be di-chlorinated, e.g. include two Cl; di-brominated, e.g. two Br; or can include a Cl and Br in the same compound. In a specific embodiment, the cross-linking agent can comprise or consist essentially of a di-chlorinated cross-linking agent. In a further embodiment, the cross-linking agent can include or consist essentially of 1,3-dichloropropane. In another specific embodiment, the cross-linking agent can comprise or consist essentially of a di-brominated cross-linking agent.

Another method for forming a latex particulate according to the present invention can include dispersing a plurality of monomers in an aqueous emulsion and providing from about 0.01% to about 60% by weight of cross-linking agent of the structure of Formula 3. The emulsion can be substantially free of poly-functional cross-linking compounds. Polymerization of the monomers and cross-linking agent can be initiated, thus forming the latex particulates that are cross-linked by the cross-linking agent. The general polymerization of the monomers to latex particulates is done by emulsion polymerization. As such, polymerization parameters, such as selection of monomers, polymerization time, emulsion temperature and conditions, etc., can be selected based on desired latex particulates and/or anticipated uses. In specific embodiments, the cross-linking agent can be a plurality of distinct and different chemical compounds that are of the structure of Formula 3. In another embodiment, the cross-linking agent can be a plurality of substantially identical chemical compounds of the structure of Formula 3. In a further embodiment, the cross-linking agent can include chlorine. In another embodiment, the cross-linking agent can include bromine.

In an additional embodiment, both non-polymerizable and polymerizable cross-linking agents can be included in the emulsion for polymerization. Such would produce a latex particulate having cross-linking from cross-linking agents of the structure of at least one of Formula 1 and Formula 2, as well as cross-linking agents of the structure of Formula 3. Again, the emulsion can be substantially free of poly-functional cross-linking compounds not of the type of Formulas 1 and 2. Such polymerization can produce latex particulates having cross-linking by the cross-linking agents. In one aspect, from about 0.05 wt % to about 15 wt % of the latex particulate can be cross-linked with the cross-linking agents.

In one embodiment, one or a plurality of solid particles can be included in the emulsion during polymerization of the monomers, with any of the disclosed cross-linking agents. The solid particles can be at least partially encapsulated during polymerization. In one aspect, the solid particles can be substantially encapsulated by the latex particulates during polymerization. Pigments can be used as the solid particles. By encapsulating pigment particles during polymerization that includes the cross-linking agents of the present application, the pigment particles can demonstrate better stability and dispersion than without encapsulation, particularly when configured for use in a thermal ink-jet ink.

Regarding the liquid vehicles and other additives that can be included in the formulations and methods of present invention, it is understood that the enumerated components are exemplary and do not limit the scope of vehicle components that can be used. For example, in some embodiments of the present invention, it may be favorable for the liquid vehicle to comprise water-soluble organic solvents or other co-solvents, and other additives as part of the liquid medium. The balance of any embodiment formulation can be purified water, or other vehicle component known in the art.

Classes of co-solvents that can be used separately or in combination include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologues of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

Additionally, the liquid vehicle can comprise humectants. Humectants can be present to enhance the longevity of solution and solubility characteristics, which can be maintained by retention of moisture within the liquid vehicle. Examples of humectants include, but are not limited to, nitrogen-containing compounds such as urea, thiourea, ethylene urea, alkylurea, alkylthiourea, dialkylurea, dialkylthiourea; sugars such as 1-deoxy-D-galactitol, mannitol, and inositol, and combinations thereof.

The liquid vehicle can also comprise solution characteristic modifiers such as viscosity modifiers, pH adjusters, preservatives, various types of surfactant, antioxidants, and evaporation accelerators. Examples of surfactants that can be included in limited amounts, according to the present invention, include primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; and combinations thereof. Fluorosurfactants can also be used such as those previously known in the art.

pH adjustors that can be used comprise base agents such as sodium hydroxide, lithium hydroxide, sodium carbonate, ammonium carbonate ammonia sodium acetate, ammonium acetate, morpholine, monoethanolamine, diethanolamine, triethanolamine, ethylmonoethanolamine, n-butyldiethanolamine, di-n-butylethanolamine, monoisopropanolamine, diisopropanolamine, and triisopropanolamine, and the like as well as combinations thereof. Additionally, pH adjustors can also comprise acidic agents that can be selected from the list of acidic crashing agents.

Consistent with the formulation of this invention, various other additives can be used to optimize the properties of the ink composition for specific applications. Examples of these additives are those added to inhibit the growth of harmful microorganisms. These additives may be biocides, fungicides, and other microbial agents, which are routinely used in liquid vehicle formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid) and the like, may be included to eliminate the deleterious effects of heavy metal impurities.

Additionally, solids (either dissolved in the liquid vehicle or dispersed therein) can also be present in the formulations of the present invention, and can include binders, other latex particulates, UV curable materials, plasticizers, pigments (other than the colorant), etc.

Latex particulates produced using the cross-linking agents as presently disclosed exhibit improved cross-linking and, as a result, improved shear stability, storage stability, and performance in ink-jet ink. Such cross-linking agents can be used in regular emulsion polymerization processes, and thus require little modification to process design. Additionally, the cross-linking agents do not produce unwanted chemical entities into the emulsion while cross-linking a latex particulate. Rather, they form cross-linking attachments throughout the latex particulate without releasing all or part of a functional group. This produces a latex dispersion that is free of undesired chemicals. Further, the cross-linking agents of Formulas 1-3 can produce cross-linking more uniformly throughout a latex particulate, as compared to other types of cross-linking agents. Uniform cross-linking improves the performance of a latex particulate, both under printing and high-shear conditions as well as printed performance.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Chloro-Containing Monomer 19.6 g of chloroethoxyethoxyethanol is dissolved in 50 ml of dichloromethane. 20 ml of triethylamine is added to the mixture. The mixture is cooled with an ice-salt mixture and 10.7 ml of acryloyl chloride is added slowly. The mixture is stirred overnight at ambient temperature. Afterward, the mixture is washed with 20 ml of water three times to remove the hydrochloride. The organic layer is collected and dried over anhydrous magnesium sulfate. It is filtered and the solvent is removed.

Example 2

Preparation of Latex Particulates with Cross-Linking Agent 7.5 g of the acrylated chloro compound of Example 1 is mixed with 7.5 g of hexyl acrylate. The mixture is emulsified in 15 ml of water with 1 g of 30% Rhodafac RS 710. Additionally, 45 ml of water is heated to 90° C. Then, 0.15 g of potassium persulfate is added to the heated water, the emulsion is also added to the heated water over a period of 5 minutes. Heating is continued for 1.5 hours at the same temperature and then the mixture is cooled. This produces latex particulates of an average particle size of 185 nm that is cross-linked. The particulates swell in organic solvents, which indicates the cross-linking is not a result of polymerizable difunctional groups.

Example 3

Preparation of Latex Particulates without Halogenated Cross-Linking Agent

The procedure of Example 2 is followed, with methyl methacrylate in place of the acrylated chloro compound of Example 1. The resulting latex particulates are soluble in organic solvents, such as tetrahydrofuran, toluene, and dichloromethane. Such solubility indicates substantially no cross-linking present.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

The invention claimed is:

1. A latex particulate, comprising:
a plurality of polymerized monomers; and
a cross-linking agent which includes the structure:

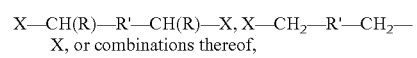
X, or combinations thereof, wherein each X is independently Cl or Br; each R is independently C1 to C10 alkyl or aryl; each R' is independently C1 to C20 alkylene; wherein from about 0.05 wt % to about 15 wt % of the latex particulate is cross-linked with the cross-linking agent; and wherein said latex particulate is formulated to be ink-jettable.

2. A latex particulate as in claim 1, wherein from about 0.5% to about 2% of the latex particulate is cross-linked with the cross-linking agent.

3. A latex particulate as in claim 1, wherein the cross-linking agent includes the structure X—CH(R)—R'—CH(R)—X.

4. A latex particulate as in claim 1, wherein the cross-linking agent includes the structure X—CH$_2$—R'—CH$_2$—X.

5. A latex particulate as in claim 1, wherein the latex particulate has a particle size of about 100 nm to about 300 nm.

6. A latex dispersion, comprising 0.1 wt % to 50 wt % of the latex particulates of claim 1 dispersed in a liquid medium.

7. An ink-jet ink, comprising 0.1 wt % to 50 wt % of the latex particulates of claim 1 dispersed in a liquid vehicle, and colorant.

8. A method of forming a latex particulate, comprising:
a) dispersing a plurality of monomers in an aqueous emulsion;
b) providing from about 0.01% to about 30% by weight of cross-linking agent, said cross-linking agent having the structure:

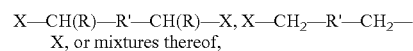
X, or mixtures thereof, wherein each X is independently Cl or Br, each R is independently alkyl or aryl, each R' is independently alkylene, wherein the aqueous emulsion is substantially free of other poly-functional cross-linking compounds;

c) initiating polymerization of the monomers; and d) forming the latex particulate such that the latex particulate is cross-linked by the cross-linking agent;

wherein said latex particulate is formulated to be ink-jettable.

9. A method as in claim 8, wherein the cross-linking agent includes the structure X—CH(R)—R'—CH(R)—X.

10. A method as in claim 8, wherein the cross-linking agent includes the structure X—CH$_2$—R'—CH$_2$—X.

11. A method as in claim 8, wherein the cross-linking agent includes a di-chlorinated cross-linking agent.

12. A method as in claim 8, wherein the cross-linking agent includes 1,3-dichloropropane.

13. A method as in claim 8, wherein the cross-linking agent includes a di-brominated cross-linking agent.

14. A latex particulate, comprising:

a plurality of polymerized monomers;

a co-polymerized cross-linking agent including the structure

CH$_2$=C(R')-A-B—CH$_2$—X, wherein X is Cl or Br; R' is H or CH$_3$; A is COO, CONH, CH$_2$, or arylene; and B is C1 to C20 alkylene or arylene, wherein from about 0.05% to about 15% of the latex particulate is cross-linked; wherein the latex particulate has a particle size of about 100 nm to about 300 nm; and wherein said latex particulate is formulated to be ink-jettable.

15. A latex particulate as in claim 14, wherein from about 0.5% to about 2% of the latex particulate is cross-linked with the cross-linking agent.

16. A latex dispersion, comprising 0.1 wt % to 50 wt % of a plurality of latex particulates of claim 14 dispersed in a liquid medium.

17. An ink-jet ink, comprising 0.1 wt % to 50 wt % of the latex particulates of claim 14 dispersed in a liquid vehicle, and colorant.

18. A method of forming a latex particulate, comprising:

a) dispersing a plurality of monomers in an aqueous emulsion;

b) providing from about 0.01% to about 60% by weight of polymerizable cross-linking agent, said cross-linking agent having the structure

CH$_2$=C(R')-A-B—CH$_2$—X, wherein X is Cl or Br; R' is H or CH$_3$; A is COO, CONH, CH$_2$, or arylene; and B is C1 to C20 alkylene or arylene, such that the emulsion is substantially free of poly-functional cross-linking compounds;

c) initiating polymerization of the monomers and cross-linking agent; and d) forming the latex particulate such that the latex particulate is cross-linked by the cross-linking agent;

wherein said latex particulate is formulated to be ink-jettable.

19. A method as in claim 18, wherein the cross-linking agent includes chlorine.

* * * * *